(12) United States Patent
Guo (10) Patent No.: US 12,350,620 B2
(45) Date of Patent: Jul. 8, 2025

(54) ADSORPTIVE SEPARATION APPARATUS (71) Applicant: SHENZHEN BITEMAN TECHNOLOGY CO., LTD, Shenzhen (CN)

(72) Inventor: Ying Hui Guo, Shenzhen (CN)

(73) Assignee: SHENZHEN BITEMAN TECHNOLOGY CO., LTD, Shenzhen (CN)

(*) Notice: Subject to any disclaimer, the term of this patent is extended or adjusted under 35 U.S.C. 154(b) by 430 days.

(21) Appl. No.: 17/997,736

(22) PCT Filed: Apr. 23, 2021

(86) PCT No.: PCT/CN2021/089113
§ 371 (c)(1),
(2) Date: Nov. 1, 2022

(87) PCT Pub. No.: WO2022/121209
PCT Pub. Date: Jun. 16, 2022

(65) Prior Publication Data
US 2023/0191317 A1    Jun. 22, 2023

(30) Foreign Application Priority Data

Dec. 11, 2020  (CN) .......................... 202011457289.1
Dec. 11, 2020  (CN) .......................... 202022989284.5

(51) Int. Cl.
*B01D 53/04* (2006.01)
*B01D 45/08* (2006.01)
(Continued)

(52) U.S. Cl.
CPC ..... *B01D 53/0462* (2013.01); *B01D 53/0407* (2013.01); *B01D 53/0438* (2013.01);
(Continued)

(58) Field of Classification Search
None
See application file for complete search history.

(56) References Cited

U.S. PATENT DOCUMENTS

| | | | |
|---|---|---|---|
| 5,993,522 A | 11/1999 | Huang | |
| 2011/0132031 A1 | 6/2011 | Rood et al. | |
| 2013/0255501 A1* | 10/2013 | Sun | B01D 45/06 96/135 |

FOREIGN PATENT DOCUMENTS

| | | |
|---|---|---|
| CN | 201006394 | 1/2008 |
| CN | 204563889 | 8/2015 |

(Continued)

OTHER PUBLICATIONS

CN209302499U_ENG (Espacenet machine translation of Guo) (Year: 2019).*

(Continued)

*Primary Examiner* — Gabriel E Gitman
(74) *Attorney, Agent, or Firm* — Hodgson Russ LLP (57) ABSTRACT

An adsorptive separation apparatus comprises an upper air pipe, a lower air pipe, an adsorption pipe assembly located between the upper air pipe and the lower air pipe, an oil-water separation seat located at an end of the lower air pipe, and an oil-water separator arranged in the oil-water separation seat. An inner cavity is formed in the oil-water separation seat, and an air intake port is provided on the outer side surface of the oil-water separation seat. The inner cavity is in communication with the air intake port and the lower air pipe. The oil-water separator is located in the inner cavity. The oil-water separator comprises a separator housing and multiple layers of wire meshes filled inside the separator housing. Multiple through holes are formed on the separator housing.

19 Claims, 7 Drawing Sheets

(51) Int. Cl.
    *B01D 53/26*         (2006.01)
    *B01D 45/04*         (2006.01)

(52) U.S. Cl.
    CPC ....... *B01D 53/0446* (2013.01); *B01D 53/261* (2013.01); *B01D 45/04* (2013.01); *B01D 45/08* (2013.01); *B01D 2253/102* (2013.01); *B01D 2253/104* (2013.01); *B01D 2253/116* (2013.01); *B01D 2257/102* (2013.01); *B01D 2257/104* (2013.01); *B01D 2257/80* (2013.01); *B01D 2259/40001* (2013.01); *B01D 2259/40088* (2013.01); *B01D 2259/402* (2013.01)

(56) References Cited

FOREIGN PATENT DOCUMENTS

| CN | 108993050 | | 12/2018 | |
| CN | 109200618 | | 1/2019 | |
| CN | 109260908 | | 1/2019 | |
| CN | 209302499 U | * | 8/2019 | ......... B01D 53/0407 |
| CN | 209934423 | | 1/2020 | |
| CN | 112337272 | | 2/2021 | |
| CN | 214182451 | | 9/2021 | |
| JP | 2009274060 | | 11/2009 | |
| WO | 2019212740 | | 11/2019 | |

OTHER PUBLICATIONS

WIPO, International Search Report for PCT/CN2021/089113, Sep. 9, 2021.

CNIPA, First fofice Action for CN Application No. 202011457289.1, Dec. 20, 2024.

\* cited by examiner

ADSORPTIVE SEPARATION APPARATUS

CROSS-REFERENCE TO RELATED APPLICATIONS

The present disclosure is a U.S. national stage entry of International Application No. PCT/CN2021/089113, filed Apr. 23, 2021, which claims priority to Chinese Patent Application No. 202022989284.5, filed Dec. 11, 2020, and priority to Chinese Patent Application No. 202011457289.1, filed Dec. 11, 2020, the entire disclosures of which are incorporated herein by reference.

FIELD OF TECHNOLOGY

The present disclosure relates to the field of gas separation, and in particular to an adsorptive separation apparatus.

BACKGROUND

An adsorptive separation apparatus is mainly used to remove water from compressed air, or separate nitrogen or oxygen from compressed gas. The adsorptive separation apparatus usually includes two groups of adsorption pipe assemblies, one for adsorption and the other one for regeneration. The two groups perform adsorption work and regeneration work alternately. An adsorbent is filled inside each group of adsorption pipes, but the to-be-separated gas, such as the compressed gas, usually includes oil. The adsorbent is easily polluted by oil, resulting in low efficiency and shortened service life, and leading to great harm to the normal use of the adsorptive separation apparatus.

SUMMARY

There is provided an adsorptive separation apparatus according to embodiments of the present disclosure. The technical solution is as below:

According to a first aspect of embodiments of the present disclosure, there is provided an adsorptive separation apparatus, including:
  an upper air pipe;
  a lower air pipe;
  an adsorption pipe assembly, wherein an upper end of the adsorption pipe assembly is connected to the upper air pipe, a lower end of the adsorption pipe assembly is connected to the lower air pipe, and an interior of the adsorption pipe assembly is in communication with both the upper air pipe and the lower air pipe;
  an oil-water separation seat located at an end of the lower air pipe, wherein an inner cavity is formed in the oil-water separation seat, an air intake port is provided on the outer side surface of the oil-water separation seat, and the inner cavity is in communication with the air intake port and the lower air pipe; and
  an oil-water separator located in the inner cavity, and comprising a separator housing and a plurality of layers of wire meshes filled inside the separator housing, wherein a plurality of through holes are formed on the separator housing, and an airflow enters the separator housing from the air intake port and comes into contact with the wire meshes for oil-water separation, and then enters the adsorption pipe assembly.

According to a second aspect of embodiments of the present disclosure, there is provided another adsorptive separation apparatus, including:
  an upper air pipe;
  a lower air pipe;
  an adsorption pipe assembly, the upper end of which is connected to the upper air pipe, the lower end of which is connected to the lower air pipe, wherein the interior of the adsorption pipe assembly is in communication with both the upper air pipe and the lower air pipe;
  a precooling assembly, used to precool an airflow before entering the adsorption pipe assembly, and comprising:
    a refrigerating upper air pipe, arranged in parallel with the upper air pipe,
    a refrigerating lower air pipe, arranged in parallel with the lower air pipe, and
    an evaporation pipe, in which a refrigerant pipe or a refrigerant channel is arranged in the evaporation pipe, and in which an airflow channel is formed, wherein the airflow channel is in communication with both the refrigerating upper air pipe and the refrigerating lower air pipe, and the airflow is capable of exchanging heat with a refrigerant in the refrigerant channel or the refrigerant pipe for precooling;
  an oil-water separation seat, arranged at an end of the refrigerating upper air pipe, wherein an inner cavity is formed in the oil-water separation seat, and is in communication with both the air intake port and the refrigerating upper air pipe; and an oil-water separator, located in the inner cavity, and comprising a separator housing and a plurality of layers of wire meshes filled inside the separator housing, wherein a plurality of through holes are formed on the separator housing, and an airflow enters the separator housing from the refrigerating lower air pipe and comes into contact with the wire meshes for oil-water separation, and then enters the evaporation pipe for precooling.

According to a third aspect of embodiments of the present disclosure, there is provided another adsorptive separation apparatus, including:
  an upper air pipe;
  a lower air pipe;
  an adsorption pipe assembly, wherein an upper end of the adsorption pipe assembly is connected to the upper air pipe, a lower end of the adsorption pipe assembly is connected to the lower air pipe, and an interior of the adsorption pipe assembly is in communication with both the upper air pipe and the lower air pipe;
  a precooling assembly configured to precool airflow entering the adsorption pipe assembly, and comprising:
    a refrigerating upper air pipe arranged in parallel with the upper air pipe,
    a refrigerating lower air pipe arranged in parallel with the lower air pipe, and
    an evaporation pipe, where a refrigerant pipe or a refrigerant channel is arranged in the evaporation pipe, wherein an airflow channel is formed in the evaporation pipe, the airflow channel is in communication with both the refrigerating upper air pipe and the refrigerating lower air pipe, and the airflow is capable of exchanging heat with refrigerant in the refrigerant channel or the refrigerant pipe for precooling;
  an oil-water separation seat arranged at an end of the refrigerating lower air pipe, wherein an inner cavity is formed in the oil-water separation seat to be in communication with the refrigerating lower air pipe, and the inner cavity is further capable of being in communication with the lower air pipe; and an oil-water separator located in the inner cavity, and comprising a separator housing and a plurality of layers of wire meshes filled inside the separator housing, wherein a plurality of through holes are formed on the separator housing, and an airflow enters the separator housing from the refrigerating lower air pipe and comes into contact with the wire meshes for oil-water separation, and then enters the lower air pipe.

It should be understood that the above general description and the following detailed description are exemplary and explanatory only and are not intended to limit the present disclosure.

BRIEF DESCRIPTION OF THE DRAWINGS

The accompanying drawings which are incorporated in and constitute a part of the description illustrate embodiments consistent with the disclosure and together with the description serve to explain the principles of the disclosure. It will be apparent that the drawings described below are only some embodiments of the present disclosure, and other drawings may be obtained from them without creative effort for those of ordinary skill in the art.

DETAILED DESCRIPTION OF THE EMBODIMENTS

To further describe the principle and structure of the present disclosure, the preferred embodiments of the present disclosure are described in detail with reference to the accompanying drawings.

The present disclosure provides an adsorptive separation apparatus, which can be used to separate water in gas or separate oxygen and nitrogen in the air according to the action of the filled adsorption material. For example, if the filled adsorption material is aluminum oxide, the adsorptive separation apparatus removes water in the gas; if the filled adsorption material is a carbon molecular sieve, oxygen in the air is removed; and if the filled adsorption material is fluorite, nitrogen in the air is removed. The adsorptive separation apparatus provided by the present disclosure may achieve different functions according to actual use requirements.

First Embodiment

Figure 1:
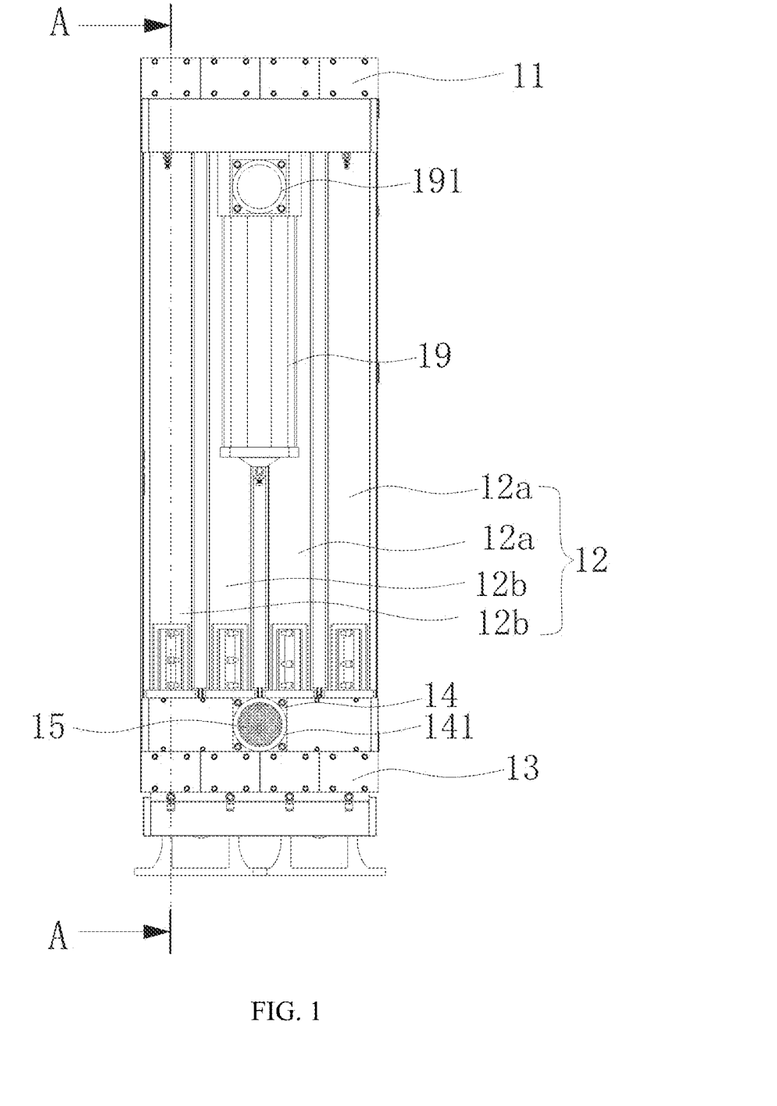
FIG. 1 is a side view of an adsorptive separation apparatus according to a first embodiment of the present disclosure.
Figure 2:
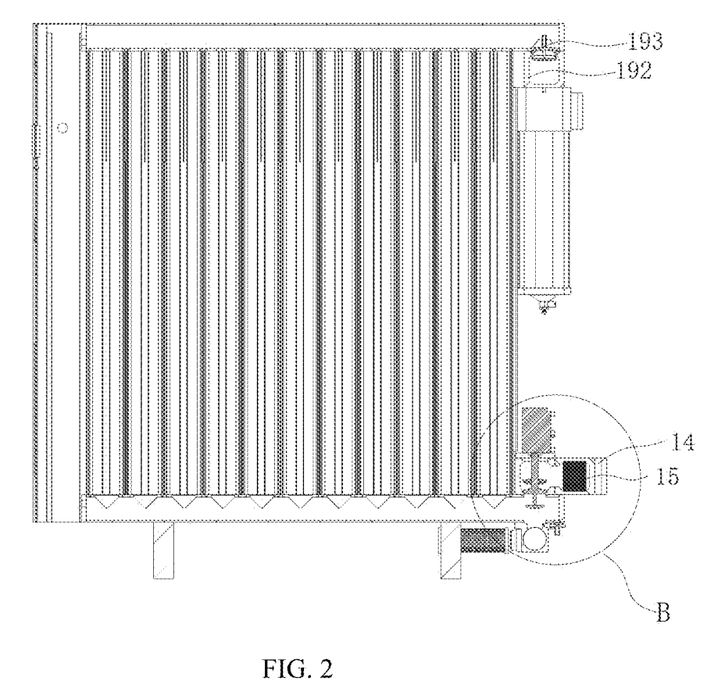
FIG. 2 is a sectional view of FIG. 1 along a line A-A.
Figure 3:
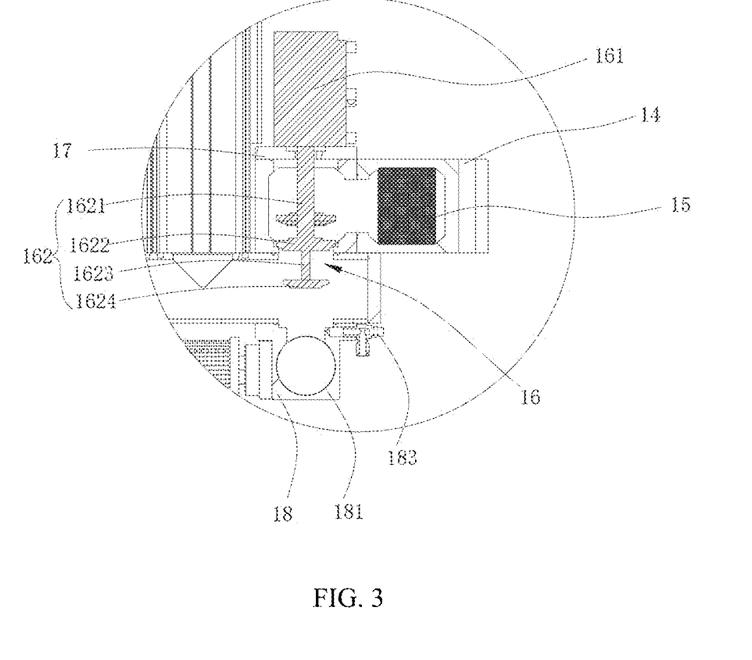
FIG. 3 is a partial enlarged view of an area B in FIG. 2.
Figure 4:
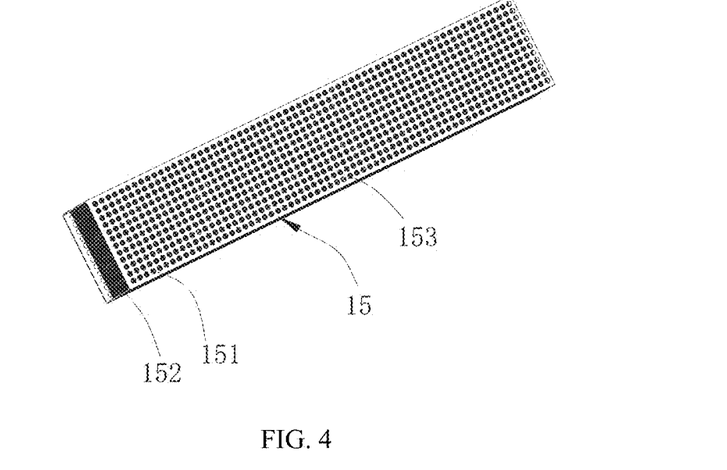
FIG. 4 is a structural schematic diagram of an oil-water separator of an adsorptive separation apparatus according to a first embodiment of the present disclosure.

As shown in FIG. 1 to FIG. 3, the present disclosure provides an adsorptive separation apparatus 100. The adsorptive separation apparatus 100 includes an upper air pipe 11, a lower air pipe 13, an adsorption pipe assembly 12 located between the upper air pipe 11 and the lower air pipe 13, an oil-water separation seat 14 located at an end of the lower air pipe 13, and an oil-water separator 15 arranged in the oil-water separation seat 14. The upper end of the adsorption pipe 12 is connected to the upper air pipe 11 and the lower end thereof is connected to the lower air pipe 13, and the interior of the adsorptive separation apparatus is in communication with both the upper air pipe 11 and the lower air pipe 13. An inner cavity is formed in the oil-water separation seat 14, an air intake port 141 is formed on the outer side surface of the oil-water separation seat 14, and the inner cavity is in communication with the air intake port 141 and the lower air pipe 13. The oil-water separator 15 is located in the inner cavity. Referring to FIG. 4, the oil-water separator 15 includes a separator housing 151 and multiple layers of wire meshes 152 filled inside the separator housing 151. A plurality of through holes are formed on the separator housing 151, and airflow enters the separator housing 151 from the air intake port 141 and comes into contact with the wire meshes 152 for oil-water separation, and then enters the adsorptive pipe assembly 12.

According to the present disclosure, the oil-water separator 15 is arranged at the air intake port 141 of the adsorptive separation apparatus 100, so that the to-be-separated airflow is subjected to oil-water separation before entering the adsorption pipe assembly 12, thereby preventing oil from polluting an adsorbent in the adsorption pipe assembly 12. The multiple layers of wire meshes are arranged in the separator housing 151, so that the contact time of the airflow and the wire meshes 152 can be prolonged, the airflow can be in full contact with the wire meshes 152, and oil in the wire meshes is condensed into liquid oil and separated, thereby completely removing the oil from the airflow. Meanwhile, part of saturated water vapor in the to-be-separated airflow is condensed into liquid water and separated when meeting the wire meshes 152.

The separator housing 151 may be a square pipe, and multiple of the through holes 153 are formed on the side surface of the square pipe at intervals, so that the to-be-separated airflow can enter from the side surface of the square pipe through the through holes 153 and come into contact with the wire meshes 152.

Figure 5:
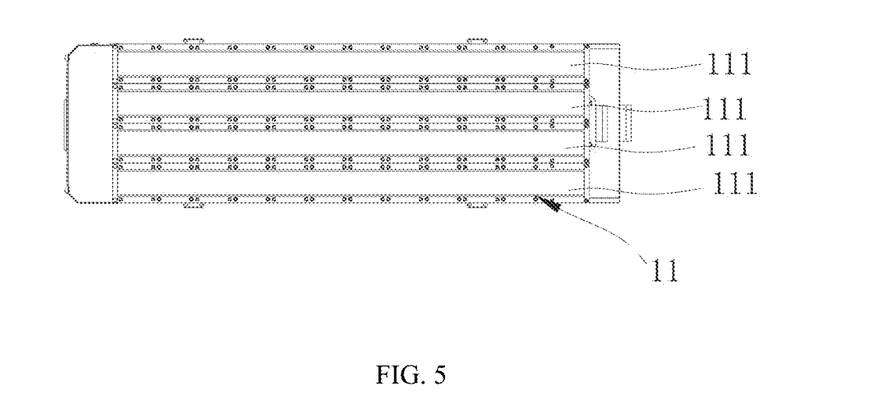
FIG. 5 is a top view of an adsorptive separation apparatus according to a first embodiment of the present disclosure.
Figure 6:
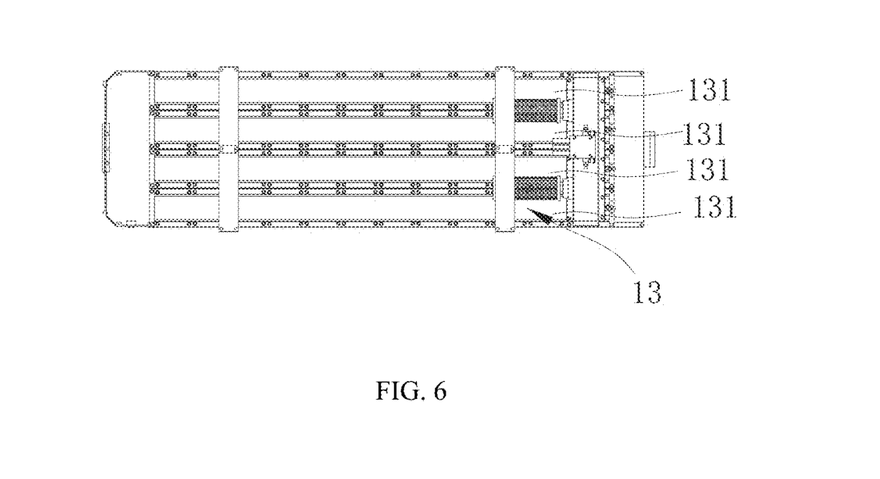
FIG. 6 is a bottom view of an adsorptive separation apparatus according to a first embodiment of the present disclosure.

One or more upper air cavities 111 may be formed in the upper air pipe 11. As shown in FIG. 5, four upper air cavities 111 are formed in the upper air pipe 11, and the upper air cavities are separated from each other. One or more lower air cavities may be formed in the lower air pipe 13. As shown in FIG. 6, four lower air cavities 131 are formed in the lower air pipe 13, and the lower air cavities 131 are separated from each other.

Figure 7:
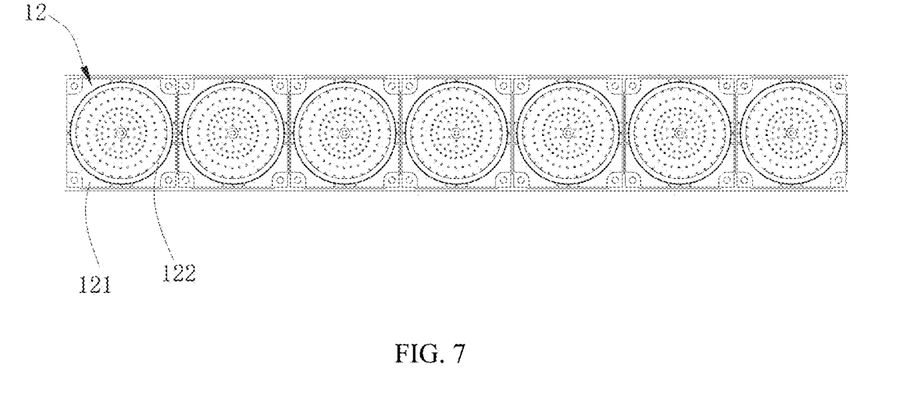
FIG. 7 is a sectional schematic diagram of an adsorption pipe assembly of an adsorptive separation apparatus according to a first embodiment of the present disclosure.

Continuously referring to FIG. 1, the adsorption pipe assembly 12 includes a first group of adsorption pipes 12a and a second group of adsorption pipes 12b, and the first group of adsorption pipes 12a and the second group of adsorption pipes 12b alternately perform adsorption work and regeneration work. Each group of adsorption pipes includes one or more rows of adsorption pipes. For example, in FIG. 1, each group of adsorption pipes includes two rows of adsorption pipes. Each row of adsorption pipes includes a plurality of adsorption pipes. As shown in FIG. 7, each adsorption pipe includes a mold core mixing pipe housing 121 and an adsorption mold core 122 fixed in the mold core mixing pipe housing 121, and an adsorbent is filled inside the adsorption mold core 122. Fixing holes are formed on the upper end face and the lower end face of the mold core fixing pipe housing 121, a fastener passes through the upper air pipe 11 and the fixing hole in the upper end face to detachably connect the upper end face of the mold core fixing pipe housing 121 with the upper air pipe 11, and the fastener passes through the lower air pipe 13 and the fixing hole in the lower end face to detachably connect the lower end face of the mold core fixing pipe housing 121 with the lower air pipe 13.

It may be understood that the structure of the adsorption pipe assembly shown in FIG. 7 is only an exemplary structure, or the structure of the adsorption pipe assembly 12 may be other structures for achieving similar functions.

Referring to FIG. 2 and FIG. 3, an air intake valve seat 17 is arranged at the back end of the lower air pipe 11, and the air intake valve seat 17 extends from the lower air pipe 11 at the leftmost end to the lower air pipe 11 at the rightmost end, so as to span each lower air cavity. The air intake valve seat 17 is provided with one or more air intake valve assembly 16, and the air intake valve assembly 16 is correspondingly arranged in each lower air cavity 131 so as to control the flowing direction of the airflow of each lower air cavity 131 or the airflow flowing to each lower air cavity 131.

The air intake valve assembly 16 includes a valve body 162 arranged on the air intake valve seat 17, and a control air cylinder 161 driving the valve body 162 to act. An air intake valve cavity is formed in the air intake valve seat 17, and is in communication with the inner cavity of the oil-water separation seat 14. A communication port is formed between the air intake valve cavity and the corresponding lower air cavity 131, and the inner cavity of the oil-water separation seat 14 is in communication with the corresponding lower air cavity 131 when the valve body 162 opens the communication port.

The adsorptive separation apparatus 100 further includes an air exhaust valve seat 18 arranged on the lower surface of the lower air pipe 13 and located under the air intake valve seat. An air exhaust valve cavity is formed in the air exhaust valve seat 18, a communication port is formed between the air exhaust valve cavity and each lower air cavity, and the valve body 162 may block the communication port between the air exhaust valve cavity and each lower air cavity. An air exhaust port 181 is formed on the side surface of the air exhaust valve seat 18, and the air exhaust valve cavity is in communication with the air exhaust port 181 so as to discharge waste gas regenerated in the lower air cavity.

The valve body 162 includes an outer shaft rod 1621, an inner shaft rod 1623 capable of being telescopic relative to the outer shaft rod 1621, an air intake pressing plate 1622 arranged on the outer shaft rod 1621, and an air exhaust pressing plate 1624 arranged on the inner shaft rod 1623. The control air cylinder 161 may control the outer shaft rod 1621 to stretch out or draw back, so that the air intake pressing plate 1622 closes or opens the communication port between the lower air cavity of the lower air pipe and the air intake valve cavity. The control air cylinder 161 may control the inner shaft rod 1623 to stretch out or draw back, so that the air exhaust pressing plate 1624 closes or opens the communication port between the lower air cavity of the lower air pipe and the air exhaust valve cavity. Since the first group of adsorption pipes 12a and the second group of adsorption pipes 12b of the adsorption pipe assembly 12 alternately perform adsorption work and regeneration work, the control air cylinder 161 controls the air exhaust pressing plate 1624 to open the communication port between the lower air cavity of the lower air pipe and the air exhaust valve cavity while controlling the air intake pressing plate 1622 to close the communication port between the lower air cavity of the lower air pipe and the air intake valve cavity. On the contrary, the control air cylinder 161 controls the air exhaust pressing plate 1624 to close the communication port between the lower air cavity of the lower air pipe and the air exhaust valve cavity while controlling the air intake pressing plate 1622 to open the communication port between the lower air cavity of the lower air pipe and the air intake valve cavity. Therefore, the lower air cavity corresponding to an adsorption working group performs air intake, and the lower air cavity corresponding to the regeneration working group performs air exhaust, thereby switching air intake and air exhaust.

The oil-water separation seat 14 is located on the outer side end face of the air intake valve seat 17. A through port is formed on the side, facing the air intake valve seat 17, of the oil-water separation seat 14, a through hole is formed on the outer side end face of the air intake valve seat 17, and the through port of the air intake valve seat 17 is alignment with the through port of the oil-water separation seat 14 in forward and backward.

It should be noted here that the orientation or position relationship indicated by the terms "front", "back", "left" and "right" in the present disclosure is an orientation or position relationship based on the accompanying drawings, is only intended to facilitate the description of the present application and simplify the description, and does not indicate or imply that the referred apparatus or component must have a specific orientation and be constructed or operated in a specific orientation, and thus cannot be understood as a limitation of the present application. In the present disclosure, the air intake valve seat and the oil-water separation seat are located at the back end, and the opposite orientation is the front end. Correspondingly, the left-right direction is perpendicular to the front-back direction.

The oil-water separator 15 is horizontally arranged in the oil-water separation seat 14, and extends from the lower air pipe 13 at the leftmost end to the lower air pipe 13 at the rightmost end, so that the oil-water separator 15 is in communication with each lower air cavity 131. The stacking direction of the wire meshes 152 is perpendicular to the air intake direction of the air intake port 141, that is, the stacking direction of the wire meshes 152 is perpendicular to a hole axis of the air intake port 141. In this way, the airflow enters through the through holes in the separator housing 151, and sequentially comes into contact with each layer of wire mesh 152 for full oil-water separation.

An oil discharge valve 183 is arranged at the bottom of the lower air pipe 13, and oil and water separated from the oil-water separator 15 are discharged through the oil discharge valve 183. Each lower air cavity is corresponding provided with one oil discharge valves 183, so that oil and water collected in each lower air cavity are discharged through the oil discharge valve 183.

The airflow after oil-water separation enters the lower air cavity, and enters the adsorption mold core of the adsorption pipe assembly 12 from the lower air cavity for adsorptive separation. The airflow after adsorptive separation is collected in the upper air cavity of the upper air pipe 11.

As shown in FIG. 2, the adsorptive separation apparatus further includes an air outlet valve seat 192 mounted at the end of the upper air pipe 11, and an air outlet one-way valve 193 is arranged on the air outlet valve seat 192. Each upper air cavity of the upper air pipe 11 is provided with one air outlet one-way valve 193 to control the flowing direction of the airflow in the upper air cavity.

Referring to FIG. 1, the adsorptive separation apparatus further includes an air outlet filtering apparatus 19 located on the back side surface of the adsorption pipe assembly 12, and the air outlet filtering apparatus 19 is used to remove impurities such as dust and particles from the separated airflow. A filter element of the air outlet filtering apparatus 19 may be a PP cotton filter element and an activated carbon filter element.

The air outlet filtering apparatus 19 is provided with an air outlet port 191, and the air outlet port 191 may be connected to a gas using end.

The airflow after adsorptive separation enters the air outlet filtering apparatus 19 for filtration and then flows to the gas using end through the air outlet port 191.

The working principle of the adsorptive separation apparatus provided by the present disclosure is described below by taking the adsorptive separation apparatus for separating water in compressed gas: gas to be separated from water enters the oil-water separation seat 14 through the air intake port 141 and comes into contact with the wire meshes of the oil-water separator 15 for oil-water separation, the airflow after oil-water separation enters one group of lower air cavities of the lower air pipe 13 and enters an adsorption mold cores 122 (for example, a first group of adsorption mold cores) in communication with the lower air cavity from the group of the lower air cavities for adsorption and dehydration, the dehydrated airflow enters one group of upper air cavities of the upper air pipe 11 corresponding to the lower air cavity, and the pressure of the airflow of the group of upper air cavities pushes the air outlet one-way valve 193 on the air outlet valve seat 192 to be opened and in communication with the air outlet port 191, so that the dried airflow flows to the gas using end. Most of airflow in the group of upper air cavities flows out through the air outlet port 191, a small amount of airflow enters another group of upper air cavities of the upper air pipe 11 through a pipeline arranged at the top of the upper air pipe, enters another group of adsorption mold core 122 (that is, the second group of adsorption mold cores) for purging and takes away water in the adsorbent, so that the adsorbent is desorbed and regenerated, and the regenerated gas enters another group of lower air cavities of the lower air pipe 13 and is discharged through the air exhaust port 181. After saturated with water, the first group of adsorption mold cores 122 need to be switched the working mode, that is, the second group of adsorption mold cores 122 perform adsorption, and the first group of adsorption mold cores 122 perform desorption and regeneration. In this way, the two groups of adsorption mold cores alternately perform adsorption and regeneration.

Second Embodiment

Figure 8:
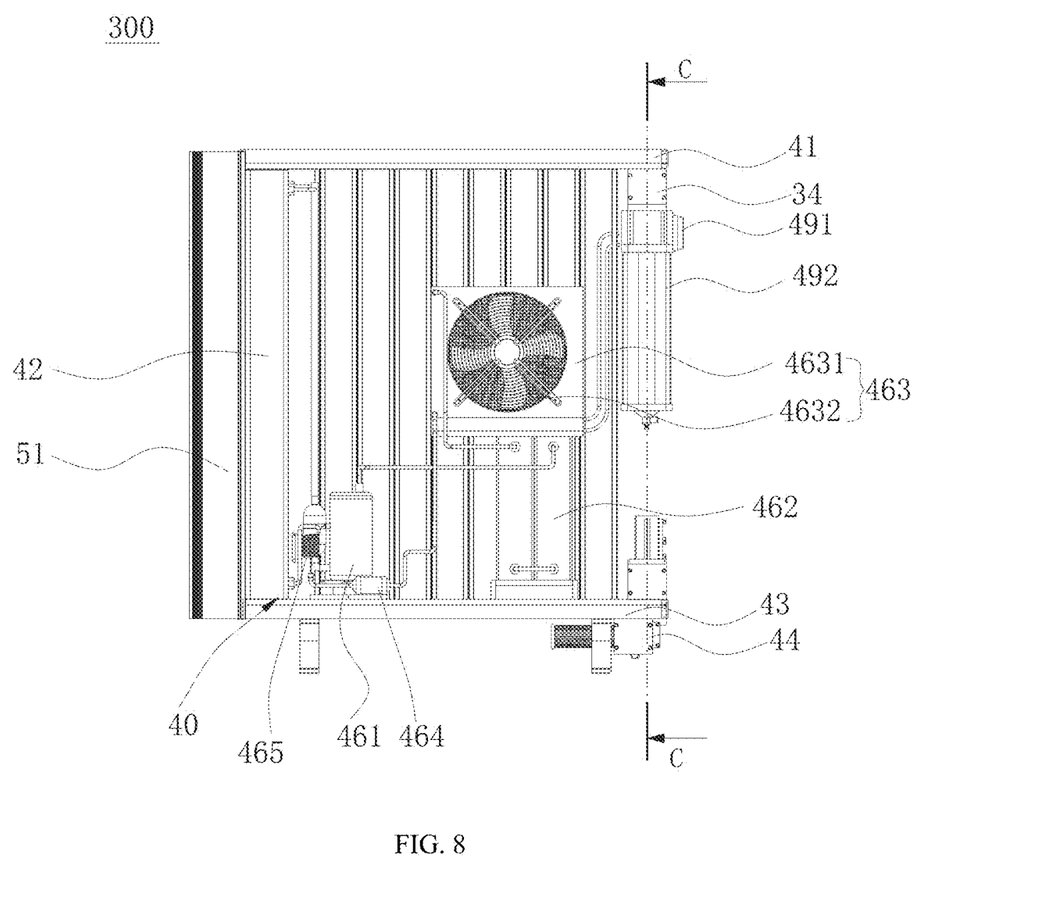
FIG. 8 is a front view of an adsorptive separation apparatus according to a second embodiment of the present disclosure.
Figure 9:
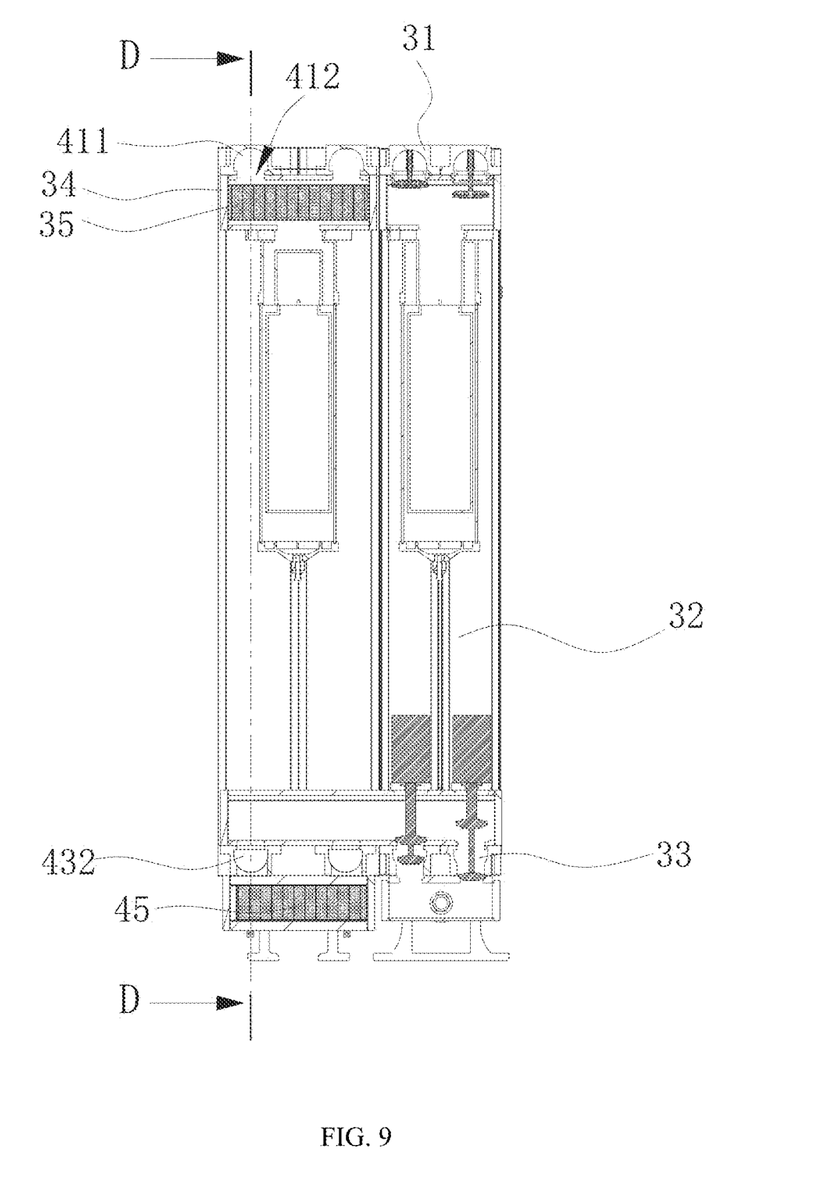
FIG. 9 is a sectional view of a line C-C in FIG. 8.
Figure 10:
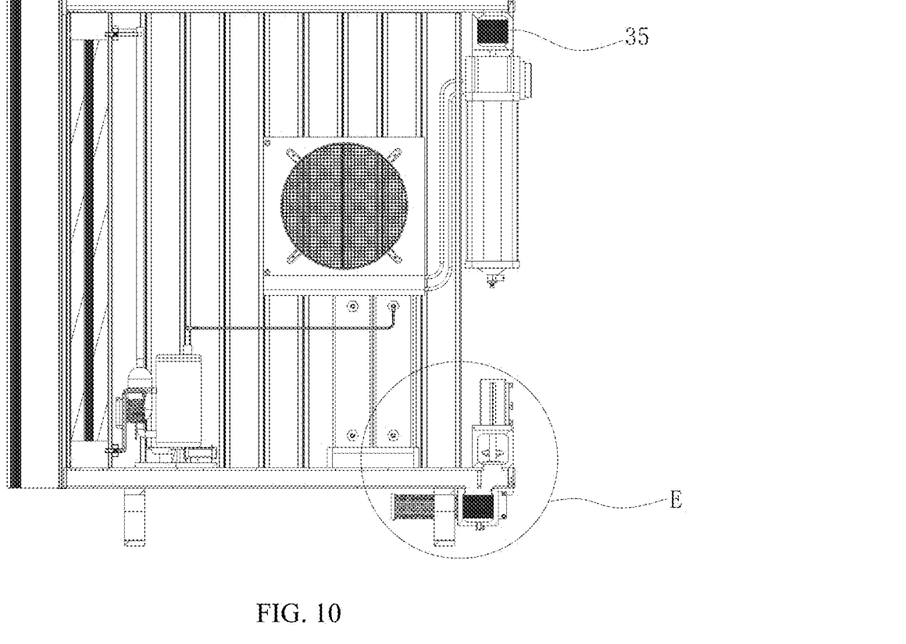
FIG. 10 is a sectional view of a line D-D in FIG. 9.

As shown in FIG. 8 to FIG. 10, the present disclosure provides an adsorptive separation apparatus 300. The adsorptive separation apparatus 300 includes an upper air pipe 31, a lower air pipe 33, an adsorption pipe assembly 32 located between the upper air pipe 31 and the lower air pipe 33, a precooling assembly 40, an oil-water separation seat 34, and an oil-water separator 35 located in the oil-water separation seat 34. The upper end of the adsorption pipe 32 is connected to the upper air pipe 31 and the lower end thereof is connected to the lower air pipe 33. The interior of the adsorptive separation apparatus is in communication with both the upper air pipe 31 and the lower air pipe 33. The precooling assembly 40 is used to precool the airflow before entering the adsorption pipe assembly, and includes a refrigerating upper air pipe 41, a refrigerating lower air pipe 43 and an evaporation pipe 42. The refrigerating upper air pipe 41 and the upper air pipe 31 are arranged in parallel, and the refrigerating lower air pipe 43 is arranged in parallel with the lower air pipe 33 and can be in communication with the lower air pipe 33. A refrigerant pipe or a refrigerant channel is arranged in the evaporation pipe 42, an airflow channel is formed in the evaporation pipe 42, the airflow channel is in communication with both the refrigerating upper air pipe 41 and the refrigerating lower air pipe 43, and the airflow can exchange heat with a refrigerant in the refrigerant channel or the refrigerant pipe for precooling.

The oil-water separation seat 34 is arranged at an end of the refrigerating upper air pipe 41, and an inner cavity is formed in the oil-water separation seat. The inner cavity is in communication with both the air intake port and the refrigerating upper air pipe 41. The oil-water separator 35 is located in the inner cavity. The structure of the oil-water separator 35 is as same as the structure of the oil-water separator 15 in the above embodiment, that is, the oil-water separator 35 includes a separator housing and multiple layers of wire meshes filled inside the separator housing, multiple through holes are formed on the separator housing, and an airflow enters the separator housing from the air intake port and comes into contact with the wire meshes for oil-water separation, and then enters the adsorption pipe assembly.

According to the present disclosure, the oil-water separator 35 is arranged at the air intake port of the adsorptive separation apparatus 300, so that the to-be-separated airflow is subjected to oil-water separation before entering the adsorption pipe assembly 32, thereby preventing oil from polluting the adsorbent in the adsorption pipe assembly 32. The multiple layers of wire meshes are arranged in the separator housing, so that the contact time of the airflow and the wire meshes can be prolonged, the airflow can be in full contact with the wire meshes, and oil in the wire meshes is condensed into liquid oil and separated, thereby completely removing the oil from the airflow. Meanwhile, part of saturated water vapor in the to-be-separated airflow is condensed into liquid water and separated when meeting the wire meshes.

As shown in FIG. 8 and FIG. 9, a plurality of mutually separated refrigerating upper air cavities 411 are formed in the refrigerating upper air pipe 41, and each refrigerating upper air cavity 411 is in communication with one corresponding row of evaporation pipes 42. The oil-water separation seat 34 is arranged on the lower surface of the refrigerating upper air pipe 41, and communication ports 412 are formed between the inner cavity of the oil-water separation seat 34 and each refrigerating upper air cavity 411 of the refrigerating upper air pipe 41, so that each refrigerating upper air cavity 411 can be in communication with the inner cavity of the oil-water separation seat 34.

The oil-water separator 35 is horizontally arranged in the inner cavity of the oil-water separation seat 34. The oil-water separator 35 almost fills the inner cavity of the whole oil-water separation seat 34, so that the airflow after oil-water separation can uniformly flow to each refrigerating upper air cavity 411.

An air intake filtering apparatus 492 is mounted on the lower surface of the oil-water separator 35 so as to remove impurities such as dust and particles from the airflow. A filter element of the air intake filtering apparatus 492 may be a PP cotton filter element and an activated carbon filter element. An air intake port 491 is formed in the outer side surface of the top of the air intake filtering apparatus 492, and the air intake port 491 is used to access the to-be-separated gas. The air intake filtering apparatus 492 is in communication with the air intake port 491 and the inner cavity of the oil-water separation seat 34, so that the to-be-separated gas is filtered by the filtering apparatus 492 to remove impurities, enters the oil-water separation seat 34 for oil-water separation, and then enters the evaporation pipe 42 for precooling through the refrigerating upper air pipe 41.

In this embodiment, two rows of evaporation pipes 42 are provided. Correspondingly, the refrigerating upper air pipe 41 is provided with two mutually separated refrigerating upper air cavities 411 respectively communicated to one row of evaporation pipes 42. The refrigerating lower air pipe 43 is also provided with two mutually separated refrigerating lower air cavities respectively connected to the lower ends of one row of evaporation pipes 42.

The adsorptive separation apparatus 300 further includes a bottom oil-water separation seat 44 arranged at the end of the refrigerating lower air pipe 43 and having an inner cavity, and a bottom oil-water separator 45 arranged in the bottom oil-water separation seat 44. The bottom oil-water separation seat 44 extends from one refrigerating lower air pipe 43 at the left end to another refrigerating lower air pipe 43 at the right end, so that the inner cavity of the bottom oil-water separation seat 44 can be in communication with each refrigerating lower air cavity of the refrigerating lower air pipe 43. The bottom oil-water separation seat 44 is located on the lower surface of the refrigerating lower air pipe 43. The bottom oil-water separator 45 has a structure as same as the structure of the oil-water separator 15 in the first embodiment, and includes a bottom separator housing and multiple layers of bottom wire meshes filled inside the bottom separator housing. An airflow enters the bottom separator housing from the refrigerating lower air pipe 43 and comes into contact with the bottom wire meshes for oil-water separation.

The bottom wire meshes substantially fill the inner cavity of the whole bottom oil-water separation seat 44, so that airflow from each refrigerating lower air cavity of the refrigerating lower air pipe 43 can be in full contact with the bottom wire meshes. The stacking direction of the bottom wire meshes is perpendicular to the direction of the airflow entering from the refrigerating lower air pipe 43.

Figure 11:
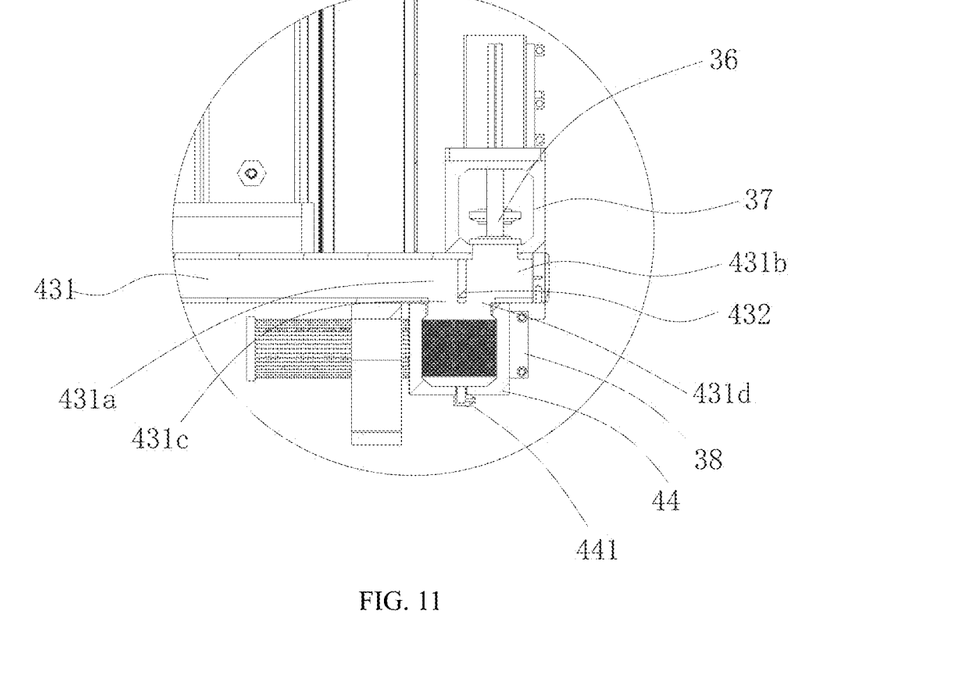
FIG. 11 is a partial enlarged view of an area E in FIG. 10.

Referring to FIG. 10 and FIG. 11, a baffle 432 is arranged in the refrigerating lower air cavity 431 of the refrigerating lower air pipe 43 and located above the inner cavity of the bottom oil-water separation seat 44. The baffle 432 dives the refrigerating lower air cavity 431 into two spaces, namely, a first space 431a and a second space 431b. A through port in communication with the bottom oil-water separation seat 44 is formed on the lower surface of the refrigerating lower air pipe 43 corresponding to each refrigerating lower air cavity. The baffle 432 is arranged above the through port to divide the through port into two secondary through ports 431c and 431d. The two secondary through ports 431c and 431d are in communication with the inner cavity of the bottom oil-water separation seat 44. The airflow enters the inner cavity of the bottom oil-water separation seat 44 from the first space 431a through the secondary through port 431c for oil-water separation, and then flows to the second space 431b through the other secondary through port 431d.

An oil discharge valve 441 is arranged at the bottom of the bottom oil-water separation seat 44 and is used to discharge oil and water collected at the bottom of the bottom oil-water separation seat 44. Correspondingly, one oil discharge valve 441 may be arranged corresponding to each refrigerating lower air cavity.

The adsorptive separation apparatus 300 further includes an air intake valve seat 37 arranged at the end of the lower air pipe 33 and the end of the refrigerating lower air pipe 43. That is, the air intake valve seat 37 extends from the refrigerating lower air pipe 43 to the lower air pipe 33. An air intake valve cavity is formed in the air intake valve seat 37, and the air intake valve cavity can be in communication with the refrigerating lower air pipe 43 and the lower air pipe 33.

The air intake valve seat 37 is located on the upper surface of the refrigerating lower air pipe 43, the first space 431a is in communication with the evaporation pipe 42 and the inner cavity of the bottom oil-water separation seat 44, and the second space 431b is in communication with the inner cavity of the bottom oil-water separation seat 44 and the air intake valve cavity, so that the precooled airflow enters the inner cavity of the bottom oil-water separation seat 44 from the first space 431a, enters the air intake valve cavity through the second space 431b, and then enters the lower air pipe 33 through the air intake valve cavity.

In this embodiment, two lower air cavities are formed in the lower air pipe 33. Correspondingly, two upper air cavities are also formed in the upper air pipe 31, and the adsorption pipe assembly 32 includes two rows.

It may be understood that the number of the air cavities formed in the lower air pipe 33 and the upper air pipe 31 may change according to the actual application, and correspondingly, the row number of the adsorption pipe assembly 32 may change according to the actual application.

In this embodiment, the internal structure and functions of the adsorption pipe assembly 32 are as same as those of the adsorption pipe assembly 12 in the first embodiment, which will not be elaborated here.

The air intake valve seat 37 is provided with an air intake valve assembly 36, corresponding to each lower air cavity of the lower air pipe, so as to control the airflow to flow to the corresponding lower air cavity. An air exhaust valve seat 38 is arranged on the lower surface of the lower air pipe 33, and the air exhaust valve seat 38 and the bottom oil-water separation seat 44 are arranged in parallel. An air exhaust port is formed on the side surface of the air exhaust valve seat 38 and is used to discharge the regenerated waste gas.

In this embodiment, the internal structure and functions of the air intake valve assembly 36 are as same as those of the air intake valve assembly 16 in the first embodiment, which will not be elaborated here.

Figure 12:
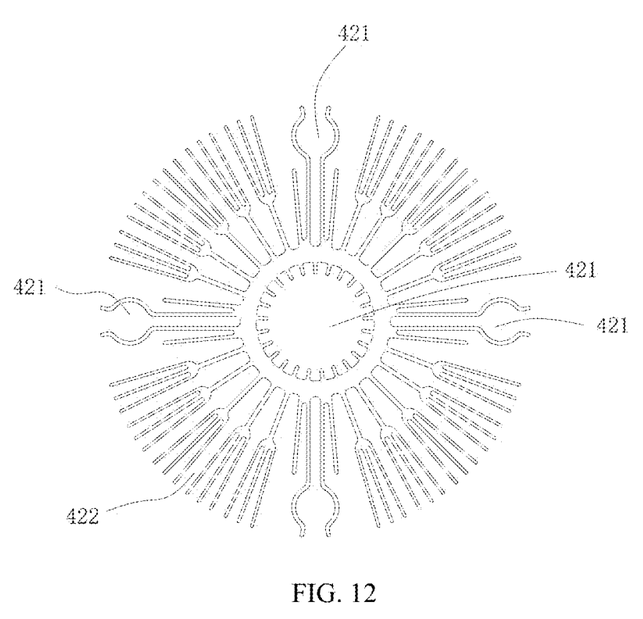
FIG. 12 is a sectional schematic diagram of an evaporation pipe of an adsorptive separation apparatus according to a second embodiment of the present disclosure.

As shown in FIG. 12, a refrigerant pipe or a refrigerant channel 421 is arranged in the evaporation pipe 42, an airflow channel 422 is formed in the evaporation pipe 42, the airflow channel 422 is in communication with both the refrigerating upper air pipe 41 and the refrigerating lower air pipe 43, and the airflow can exchange heat with a refrigerant in the refrigerant channel 421 or the refrigerant pipe for precooling.

It may be understood that the structure of the evaporating pipe shown in FIG. 12 is only an exemplary structure, or the structure of the evaporating pipe may be other structures for achieving similar functions.

As shown in FIG. 8, the precooling assembly 40 further includes a refrigerant compressor 461, a heat recovery unit 462, a condensing unit 463, a refrigerant filter 464 and a throttling apparatus 465.

The refrigerant compressor 461 is used to compress a high-temperature and normal-pressure gaseous refrigerant output by the evaporation pipe 42 into a high-temperature and high-pressure gaseous refrigerant. The heat recovery unit 462 is used to cool the high-temperature and high-pressure gaseous refrigerant output by the refrigerant compressor 461 into a medium-temperature and high-pressure gaseous refrigerant. The high-temperature and high-pressure gaseous refrigerant is used to exchange heat with the separated regenerated airflow to increase the temperature of the regenerated airflow, thereby improving the regeneration capability of the regenerated airflow on the adsorbent and increasing the recycling rate. The condensing unit 463 is used to condense the medium-temperature and high-pressure gaseous refrigerant output by the heat recovery unit 462 into a low-temperature and high-pressure liquid refrigerant. The refrigerant filter 464 is used to filter an impurity in the low-temperature and high-pressure liquid refrigerant output by the condensing unit 463. The throttling apparatus 465 is used to depressurize the low-temperature and high-pressure liquid refrigerant filtered by the refrigerant filter 464 into a low-temperature and low-pressure liquid refrigerant. The depressurized low-temperature and low-pressure liquid refrigerant is transmitted to the evaporation pipe 42.

The heat recovery unit 462 includes a heat recovery outer housing and a refrigerant channel arranged in the heat recovery outer housing. The refrigerant channel is in communication with the output end of the refrigerant compressor 461. The high-temperature and high-pressure gaseous refrigerant output by the refrigerant compressor 461 flows into the refrigerant channel, regenerated airflow is introduced into an inner cavity of the heat recovery outer housing and exchanges heat with the pipe wall of the refrigerant channel. On one hand, the refrigerant is cooled, and on the other hand, the temperature of the regenerated airflow is increased to improve the regeneration capability and take away more water.

A plurality of heat recovery units 462 are arranged between the refrigerating upper air pipe 41 and the refrigerating lower air pipe 43, but not in communication with the refrigerating upper air pipe 41 and the refrigerating lower air pipe 43. The heat recovery unit 462 includes two regenerated airflow pipeline, one end of each regenerated airflow pipeline is in communication with one upper air cavity of the upper air pipe, and the other end of each regenerated airflow pipeline is in communication with the top of the heat recovery outer housing, so that the separated airflow located in the upper air cavity can be purged from the top of the heat recovery outer housing to the bottom, and exchange heat with the high-temperature and high-pressure refrigerant in the refrigerant channel. The airflow after heat exchange is conveyed into the upper air cavity of the regeneration group through an external pipeline, and the airflow in the upper air cavity is purged downwards to perform desorption and regeneration on the adsorbent in the regeneration group.

The heat recovery unit 462 may include a spiral refrigerant pipe extending from the top of the heat recovery outer housing to the bottom, and an inner cavity of the refrigerant pipe is a refrigerant channel.

The heat recovery unit 462 may further include a metal pipe and a fin arranged at the periphery of the metal pipe, and an inner cavity of the metal pipe is a refrigerant channel. The metal pipe and the fin may be integrally formed.

The condensing unit 463 includes a condenser 4631 and a fan 2632. A refrigerant pipe for a refrigerant to circulate is arranged in the condenser 4631, and the fan 4632 performs purging and heat dissipation on the refrigerant pipe to reduce the temperature of the refrigerant.

The condenser 4631 may include a circuitous copper pipe and a fin welded on the copper pipe, and the refrigerant flows into the copper pipe and is cooled through the fin and the fan.

In addition, the low-temperature gas after adsorptive separation may also be used to cool the refrigerant in the condenser 4631 and recycle energy. Specifically, the condenser 4631 includes a condensing housing and a condensing pipe arranged in the condensing housing, part of cooling airflow in the upper air pipe 31 may be led into the condensing housing through a pipeline and exchange heat with a high-temperature refrigerant in the condensing pipe, and then led to the gas using end through a pipeline.

The throttling apparatus 465 may be a capillary tube.

A control assembly part 51 is arranged on the front side of the adsorptive separation apparatus 300. The control assembly part 51 includes control devices such as a controller and an electromagnetic valve. A touchable control panel is arranged in front of the control assembly part 51.

In this embodiment, the airflow is subjected to first oil-water separation before entering the precooling assembly 40, and then enters the bottom oil-water separator for second oil-water separation after being precooled. Therefore, oil is separated more completely through multiple separations before the air enters the adsorption pipe assembly, thereby preventing the oil from polluting the adsorbent and avoiding reduced adsorption efficiency caused by pollution.

In addition, in other embodiments, the adsorptive separation apparatus provided by the present disclosure may unnecessarily perform oil-water separation for twice. That is, the number and mounting positions of the oil-water separators may be selected according to the actual application. For example, the oil-water separator 35 may be mounted only on the lower surface of the refrigerating upper air pipe, or the oil-water separator 45 may be mounted only on the lower surface of the refrigerating lower air pipe. That is, oil-water separation is performed before the airflow enters the precooling assembly 40, or oil-water separation is performed after the airflow is precooled.

In another embodiment, the present disclosure provides another adsorptive separation apparatus. In this embodiment, the oil-water separator is mounted after airflow precooling and before adsorptive separation. Specifically, the adsorptive separation apparatus includes an upper air pipe, a lower air pipe, an adsorptive pipe assembly, a precooling assembly, an oil-water separation seat and an oil-water separator.

The upper end of the adsorption pipe assembly is connected to the upper air pipe and the lower end of the adsorption pipe assembly is connected to the lower air pipe. The interior of the adsorption pipe assembly is in communication with both the upper air pipe and the lower air pipe. The precooling assembly is used to precool an airflow entering the adsorption pipe assembly, and includes a refrigerating upper air pipe, a refrigerating lower air pipe and an evaporation pipe. The refrigerating upper air pipe and the upper air pipe are arranged in parallel. The refrigerating lower air pipe is arranged in parallel with the lower air pipe, and can be in communication with the lower air pipe. A refrigerant pipe or a refrigerant channel is formed in the evaporation pipe, and an airflow channel is formed in the evaporation pipe. The airflow channel is in communication with both the refrigerating upper air pipe and the refrigerating lower air pipe. An airflow can exchange heat with a refrigerant in the refrigerant channel or the refrigerant pipe for precooling.

The oil-water separation seat is arranged at an end of the refrigerating lower air pipe. An inner cavity is formed in the oil-water separation seat and can be in communication with the refrigerating lower air pipe and the lower air pipe.

The oil-water separator is located in the inner cavity, and includes a separator housing and multiple layers of wire meshes filled inside the separator housing. Multiple through holes are formed on the separator housing. An airflow enters the separator housing from the refrigerating lower air pipe and comes into contact with the wire meshes for oil-water separation, and then enters the lower air pipe.

In this embodiment, the oil-water separation seat has the same structure and functions as those of the oil-water separation seat 44 in the second embodiment, and the oil-water separator has the same structure and functions as those of the oil-water separator 45, which will not be elaborated herein.

A baffle is arranged in the refrigerating lower air cavity of the refrigerating lower air pipe and located above the inner cavity of the oil-water separation seat. The baffle divides the refrigerating lower air cavity into two spaces, namely, a first space and a second space. An airflow enters the inner cavity of the oil-water separation seat from the first space for oil-water separation, and then flows to the second space.

The adsorptive separation apparatus further includes an air intake valve seat arranged at an end of the lower air pipe and an end of the refrigerating lower air pipe. An air intake valve cavity is formed in the air intake valve seat. The air intake valve cavity can be in communication with the refrigerating lower air pipe and the lower air pipe. The oil-water separation seat is located on the lower surface of the refrigerating lower air pipe, and the air intake valve seat is located on the upper surface of the refrigerating lower air pipe. The first space is in communication with the evaporation pipe and the inner cavity of the oil-water separation seat, and the second space is in communication with the inner cavity of the oil-water separation seat and the air intake valve cavity, so that the precooled airflow enters the inner cavity of the oil-water separation seat for oil-water separation from the first space, enters the air intake valve cavity through the second space, then enters the lower air pipe through the air intake valve cavity, and finally enters the adsorption pipe assembly for adsorptive separation.

The above are only the preferred and feasible embodiments of the present disclosure, and are not intended to limit the protection scope of the present disclosure. All equivalent structural changes made by using the contents of the specification and accompanying drawings of the present disclosure are all included in the protection scope of the present disclosure

What is claimed is:

1. An adsorptive separation apparatus, comprising:
    an upper air pipe;
    a lower air pipe;
    an adsorption pipe assembly, wherein an upper end of the adsorption pipe assembly is connected to the upper air pipe, a lower end of the adsorption pipe assembly is connected to the lower air pipe, and an interior of the adsorption pipe assembly is in communication with both the upper air pipe and the lower air pipe;
    an oil-water separation seat located at an end of the lower air pipe, wherein an inner cavity is formed in the oil-water separation seat, an air intake port is provided on an outer side surface of the oil-water separation seat, and the inner cavity is in communication with the air intake port and the lower air pipe; and
    an oil-water separator located in the inner cavity, and comprising a separator housing and a plurality of layers of wire meshes filled inside the separator housing, wherein a plurality of through holes are formed on the separator housing, and an airflow enters the separator housing from the air intake port and comes into contact with the wire meshes for oil-water separation, and then enters the adsorption pipe assembly.

2. The adsorptive separation apparatus according to claim 1, wherein the adsorption pipe assembly comprises a first group of adsorption pipes and a second group of adsorption pipes, wherein the first group of adsorption pipes and the second group of adsorption pipes alternately perform adsorption work and regeneration work, wherein each group of adsorption pipes comprises one or more rows of adsorption pipes, each of which is filled with an adsorbent, wherein one or more upper air cavities are formed in the upper air pipe, one or more lower air cavities are formed in the lower air pipe, and each row of adsorption pipes is in communication with one upper air cavity of the upper air pipe and one corresponding lower air cavity of the lower air pipe;
    wherein an air intake valve seat is arranged at the end of the lower air pipe, one or more than one air intake valve assembly is arranged on the air intake valve seat, and each air intake valve assembly is correspondingly arranged in each of the lower air cavities so as to control an airflow direction of each of the lower air cavities or an airflow flowing to each of the lower air cavities; and
    wherein each air intake valve assembly comprises a valve body arranged on the air intake valve seat and a control air cylinder driving the respective valve body to act, wherein a respective air intake valve cavity is formed in the air intake valve seat in communication with the inner cavity of the oil-water separation seat, wherein a respective communication port is formed between each air intake valve cavity and the lower air cavity of each lower air pipe, and the inner cavity of the oil-water separation seat is in communication with each lower air cavity when the respective valve body opens the respective communication port.

3. The adsorptive separation apparatus according to claim 2, further comprising an air exhaust valve seat arranged on the lower surface of the lower air pipe, wherein the air exhaust valve seat is located under the air intake valve seat, an air exhaust valve cavity is formed in the air exhaust valve seat, an air exhaust port is formed on a side surface of the air exhaust valve seat, and the air exhaust valve cavity is in communication with the air exhaust port; and
    wherein each valve body comprises an outer shaft rod, an inner shaft rod capable of being telescopic relative to the outer shaft rod, an air intake pressing plate arranged on the outer shaft rod, and an air exhaust pressing plate arranged on the inner shaft rod, the control air cylinder controls the air intake pressing plate to close or open the communication port between the respective lower air cavity of the lower air pipe and the air intake valve cavity, and the control air cylinder controls the air exhaust pressing plate to close or open the communication port between the lower air cavity of the lower air pipe and the air exhaust valve cavity.

4. The adsorptive separation apparatus according to claim 3, wherein the air intake valve seat is arranged on the upper surface of the lower air pipe, the oil-water separation seat is located on an outer side end face of the air intake valve seat, a through port is formed on the side, facing the air intake valve seat, of the oil-water separation seat, a through hole is formed on an outer side end face of the air intake valve seat, and a through port of the air intake valve seat is in forward and backward alignment with the through port of the oil-water separation seat.

5. The adsorptive separation apparatus according to claim 1, wherein a stacking direction of the wire meshes is along an airflow direction through the air intake port.

6. The adsorptive separation apparatus according to claim 5, wherein the separator housing is a square pipe, the through holes are formed on an outer circumferential surface of the square pipe, and the square pipe is horizontally arranged in the inner cavity of the oil-water separator.

7. The adsorptive separation apparatus according to claim 5, wherein an oil discharge valve is arranged at a bottom of the lower air pipe, and oil and water separated from the oil-water separator are discharged through the oil discharge valve.

8. An adsorptive separation apparatus, comprising:
an upper air pipe;
a lower air pipe;
an adsorption pipe assembly, an upper end of which is connected to the upper air pipe, the lower end of which is connected to the lower air pipe, wherein an interior of the adsorption pipe assembly is in communication with both the upper air pipe and the lower air pipe;
a precooling assembly, used to precool an airflow before entering the adsorption pipe assembly, and comprising:
a refrigerating upper air pipe, arranged in parallel with the upper air pipe,
a refrigerating lower air pipe, arranged in parallel with the lower air pipe, and
an evaporation pipe, in which a refrigerant pipe or a refrigerant channel is arranged in the evaporation pipe, and in which an airflow channel is formed, wherein the airflow channel is in communication with both the refrigerating upper air pipe and the refrigerating lower air pipe, and the airflow channel is capable of exchanging heat with a refrigerant in the refrigerant channel or the refrigerant pipe for precooling;
an oil-water separation seat, wherein an inner cavity is formed in the oil-water separation seat, and is in communication with both an air intake port and the refrigerating upper air pipe; and
an oil-water separator, located in the inner cavity, and comprising a separator housing and a plurality of layers of wire meshes filled inside the separator housing, wherein a plurality of through holes are formed on the separator housing, and the airflow enters the separator housing from the refrigerating upper air pipe and comes into contact with the wire meshes for oil-water separation, and then enters the evaporation pipe for precooling.

9. The adsorptive separation apparatus according to claim 8, wherein the oil-water separation seat is located on a lower surface of the refrigerating upper air pipe, and a communication port is formed between the inner cavity of the oil-water separation seat and a refrigerating upper air cavity of the refrigerating upper air pipe, so that the refrigerating upper air cavity is capable of being in communication with the inner cavity of the oil-water separation seat.

10. The adsorptive separation apparatus according to claim 8, further comprising:
a bottom oil-water separation seat arranged at an end of the refrigerating lower air pipe and having an inner cavity, and
a bottom oil-water separator arranged in the bottom oil-water separation seat, wherein the bottom oil-water separator comprises a bottom separator housing and a plurality of layers of bottom wire meshes filled inside the bottom separator housing, wherein a plurality of through holes are formed on the bottom separator housing, and the airflow enters the bottom separator housing from the refrigerating lower air pipe and comes into contact with the bottom wire meshes for oil-water separation; and
wherein a baffle is arranged in a refrigerating lower air cavity of the refrigerating lower air pipe and located above the inner cavity of the bottom oil-water separation seat, wherein the baffle divides the refrigerating lower air cavity into two spaces, namely a first space and a second space, and the airflow enters the inner cavity of the bottom oil-water separation seat from the first space for oil-water separation and then flows to the second space.

11. The adsorptive separation apparatus according to claim 10, further comprising an air intake valve seat arranged at an end of the lower air pipe and an end of the refrigerating lower air pipe, wherein an air intake valve cavity is formed in the air intake valve seat, and the air intake valve cavity is capable of being in communication with the refrigerating lower air pipe and the lower air pipe;
wherein the bottom oil-water separation seat is located on a lower surface of the refrigerating lower air pipe, and the air intake valve seat is located on an upper surface of the refrigerating lower air pipe, wherein the first space is in communication with the evaporation pipe and the inner cavity of the bottom oil-water separation seat, and the second space is in communication with the inner cavity of the bottom oil-water separation seat and the air intake valve cavity, so that the airflow enters the inner cavity of the bottom oil-water separation seat from the first space for oil-water separation, and then flows into the air intake valve cavity through the second space.

12. The adsorptive separation apparatus according to claim 10, wherein a through port in communication with the bottom oil-water separation seat is formed on a lower surface of the refrigerating lower air pipe, and wherein the baffle is located above the through port to divide the through port into two secondary through ports, and the two secondary through ports are in communication with the inner cavity of the bottom oil-water separation seat.

13. The adsorptive separation apparatus according to claim 11, wherein the precooling assembly further comprises:
a refrigerant compressor, configured to compress a high-temperature and normal-pressure gaseous refrigerant output by the evaporation pipe into a high-temperature and high-pressure gaseous refrigerant;
a heat recovery unit, configured to cool the high-temperature and high-pressure gaseous refrigerant output by the refrigerant compressor into a medium-temperature and high-pressure gaseous refrigerant, and to utilize the high-temperature and high-pressure liquid gaseous refrigerant to exchange heat with a separated regenerated airflow to increase a temperature of the regenerated airflow;
a condensing unit, configured to condense the medium-temperature and high-pressure gaseous refrigerant output by the heat recovery unit into a low-temperature and high-pressure liquid refrigerant;
a refrigerant filter, configured to filter an impurity in the low-temperature and high-pressure liquid refrigerant output by the condensing unit; and a throttling apparatus, configured to depressurize the low-temperature and high-pressure liquid refrigerant filtered by the refrigerant filter into a low-temperature and low-pressure liquid refrigerant, and to convey the depressurized low-temperature and low-pressure liquid refrigerant into the evaporation pipe.

14. The adsorptive separation apparatus according to claim 8, further comprising an air intake filtering apparatus mounted on a lower surface of the oil-water separation seat, wherein the air intake port is formed on the air intake filtering apparatus, and the air intake filtering apparatus is in communication with the air intake port and the inner cavity of the oil-water separation seat.

15. An adsorptive separation apparatus, comprising:
an upper air pipe;
a lower air pipe;
an adsorption pipe assembly, wherein an upper end of the adsorption pipe assembly is connected to the upper air pipe, a lower end of the adsorption pipe assembly is connected to the lower air pipe, and an interior of the adsorption pipe assembly is in communication with both the upper air pipe and the lower air pipe;
a precooling assembly configured to precool an airflow entering the adsorption pipe assembly, and comprising:
a refrigerating upper air pipe arranged in parallel with the upper air pipe,
a refrigerating lower air pipe arranged in parallel with the lower air pipe, and
an evaporation pipe, where a refrigerant pipe or a refrigerant channel is arranged in the evaporation pipe, wherein an airflow channel is formed in the evaporation pipe, the airflow channel is in communication with both the refrigerating upper air pipe and the refrigerating lower air pipe, and the airflow channel is capable of exchanging heat with refrigerant in the refrigerant channel or the refrigerant pipe for precooling;
an oil-water separation seat arranged at an end of the refrigerating lower air pipe, wherein an inner cavity is formed in the oil-water separation seat to be in communication with the refrigerating lower air pipe, and the inner cavity is further capable of being in communication with the lower air pipe; and
an oil-water separator located in the inner cavity, and comprising a separator housing and a plurality of layers of wire meshes filled inside the separator housing, wherein a plurality of through holes are formed on the separator housing, and the airflow enters the separator housing from the refrigerating lower air pipe and comes into contact with the wire meshes for oil-water separation, and then enters the lower air pipe.

16. The adsorptive separation apparatus according to claim 15, wherein a baffle is arranged in a refrigerating lower air cavity of the refrigerating lower air pipe and located above the inner cavity of the oil-water separation seat, the baffle divides the refrigerating lower air cavity into two spaces, namely a first space and a second space, and the airflow enters the inner cavity at a bottom of the oil-water separation seat from the first space for oil-water separation and then flows to the second space.

17. The adsorptive separation apparatus according to claim 16, further comprising:
an air intake valve seat, wherein the air intake valve seat is arranged at an end of the lower air pipe and an end of the refrigerating lower air pipe, an air intake valve cavity is formed in the air intake valve seat, and the air intake valve cavity is capable of being in communication with the refrigerating lower air pipe and the lower air pipe; and
wherein the oil-water separation seat is located on a lower surface of the refrigerating lower air pipe, the air intake valve seat is located on an upper surface of the refrigerating lower air pipe, the first space is in communication with the evaporation pipe and the inner cavity of the oil-water separation seat, and the second space is in communication with the inner cavity of the oil-water separation seat and the air intake valve cavity, so that a precooled airflow enters the inner cavity of the oil-water separation seat from the first space for oil-water separation, and then flows into the air intake valve cavity through the second space.

18. The adsorptive separation apparatus according to claim 16, wherein a through port in communication with the oil-water separation seat is formed on a lower surface of the refrigerating lower air pipe, the baffle is located above the through port to divide the through port into two secondary through ports, and the two secondary through ports are in communication with the inner cavity of the oil-water separation seat.

19. The adsorptive separation apparatus according to claim 18, wherein the precooling assembly further comprises:
a refrigerant compressor configured to compress a high-temperature and normal-pressure gaseous refrigerant output by the evaporation pipe into a high-temperature and high-pressure gaseous refrigerant;
a heat recovery unit configured to cool the high-temperature and high-pressure gaseous refrigerant output by the refrigerant compressor into a medium-temperature and high-pressure gaseous refrigerant, and to utilize the high-temperature and high-pressure gaseous refrigerant to exchange heat with a separated regenerated airflow to increase a temperature of the regenerated airflow;
a condensing unit configured to condense the medium-temperature and high-pressure gaseous refrigerant output by the heat recovery unit into a low-temperature and high-pressure liquid refrigerant;
a refrigerant filter configured to filter an impurity in the low-temperature and high-pressure liquid refrigerant output by the condensing unit; and
a throttling apparatus configured to depressurize the low-temperature and high-pressure liquid refrigerant filtered by the refrigerant filter into a low-temperature and low-pressure liquid refrigerant, and to convey the depressurized low-temperature and low-pressure liquid refrigerant into the evaporation pipe.

\* \* \* \* \*